United States Patent
van Wonderen et al.

(10) Patent No.: US 6,892,865 B2
(45) Date of Patent: May 17, 2005

(54) MONOTUBE SHOCK ABSORBER REMOTE RESERVOIR FLUID CONNECTION

(75) Inventors: Simon van Wonderen, Toronto (CA); Julian Harbu, Toronto (CA)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/632,308

(22) Filed: Aug. 1, 2003

(65) Prior Publication Data

US 2005/0022355 A1 Feb. 3, 2005

(51) Int. Cl.[7] .................................................. F16F 9/00
(52) U.S. Cl. ...................... 188/314; 188/316; 188/318; 29/888.06
(58) Field of Search .............................. 188/315, 318, 188/322.2, 314, 316; 29/888.06, 428

(56) References Cited

U.S. PATENT DOCUMENTS

| 4,162,750 | A | * | 7/1979 | Demers et al. ............. 222/250 |
| 4,834,088 | A | * | 5/1989 | Jeanson ...................... 188/298 |
| 4,928,799 | A | * | 5/1990 | Zschiesche ................. 188/314 |
| 5,094,325 | A | * | 3/1992 | Smith ....................... 188/282.1 |
| 5,980,339 | A | * | 11/1999 | Hartman et al. .......... 440/61 R |
| 6,182,806 | B1 | * | 2/2001 | Hasegawa ................... 188/314 |
| 6,659,241 | B2 | * | 12/2003 | Sendrea ..................... 188/314 |
| 2003/0094341 | A1 | * | 5/2003 | Lemieux ..................... 188/316 |
| 2004/0090020 | A1 | * | 5/2004 | Braswell .................. 280/5.515 |

FOREIGN PATENT DOCUMENTS

| DE | 4102002 | * | 7/1992 |
| EP | 0905408 | * | 3/1999 |
| JP | 04-088232 | * | 3/1992 |
| RU | 2089765 | * | 9/1997 |
| RU | 2213015 | * | 9/2003 |

* cited by examiner

Primary Examiner—Eric Compton
(74) Attorney, Agent, or Firm—Carlson, Gaskey & Olds

(57) ABSTRACT

A damper assembly includes a reservoir chamber for supplying hydraulic fluid to a main damper chamber. The reservoir chamber is in fluid communication with damper chamber through an internal fluid passage formed by openings in the damper housing and the reservoir housing. Mating features align the reservoir and damper housing relative to each other.

8 Claims, 2 Drawing Sheets

US 6,892,865 B2

MONOTUBE SHOCK ABSORBER REMOTE RESERVOIR FLUID CONNECTION

BACKGROUND OF THE INVENTION

This invention relates to a monotube shock absorber with a remote reservoir fluid chamber and specifically to a monotube shock absorber with an integral passage between the reservoir and the damper chamber.

Monotube shock absorbers are known in the art to include a reservoir chamber having a quantity of fluid in communication with a main chamber of the shock absorber. The main chamber of the shock absorber includes a piston that divides the chamber and controls the fluid flow between sections of the chamber. The fluid reservoir provides additional hydraulic fluid to the main chamber in response to movement of the piston within the main chamber.

The fluid reservoir allows the main chamber to be constructed shorter than normally would be allowed and may allow the use of a larger shaft that connects the piston and shock absorber to one mounting member. The shaft takes up volume within the main chamber and the larger the diameter of the shaft, the less volume available for the storage of hydraulic fluid in the main chamber. For these reasons, it has been found desirable to provide additional hydraulic fluid within a remote reservoir chamber.

Typically, communication between the main chamber and the reservoir chamber is provided by a fluid communicating passage such as a flexible hose or steel tubing. As appreciated, the connection between the main chamber and the reservoir chamber requires seals. Dampers typically operate at extreme pressures and each seal is a potential leak point. In addition, an external hose or tube is exposed to potential damage given the harsh environment within which the shock absorber operates.

Accordingly, it is desirable to develop and design a reservoir chamber for a shock absorber that eliminates external passageways to prevent potential damage and eliminate potential leak points.

SUMMARY OF THE INVENTION

The invention is a monotube shock absorber assembly having an integral passageway between the main damper chamber and the reservoir chamber.

The shock absorber of this invention includes a damper chamber and a reservoir chamber. The damper chamber and the reservoir chamber are formed by aluminum extrusion to form mating features that combine to form the fluid communication passage between the damper chamber and the reservoir chamber. The extruded mating features are designed to aid assembly and provide an interlocking profile between the main damper chamber and the reservoir chamber. The reservoir chamber is mechanically attached to the main damper chamber such that the reservoir chamber and main damper chamber cooperate to form a passage therebetween.

In another embodiment of this invention the damper chamber and reservoir chamber are integrally formed by an aluminum extrusion such that each of the chambers are formed in parallel to another in a common housing. The passageway is then formed between the two chambers to eliminate the need for any seal or mechanical attaching means.

Accordingly, the damper assembly of this invention includes a fluid communication passage between the reservoir and the damper chamber eliminating any external passage or fluid connection.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
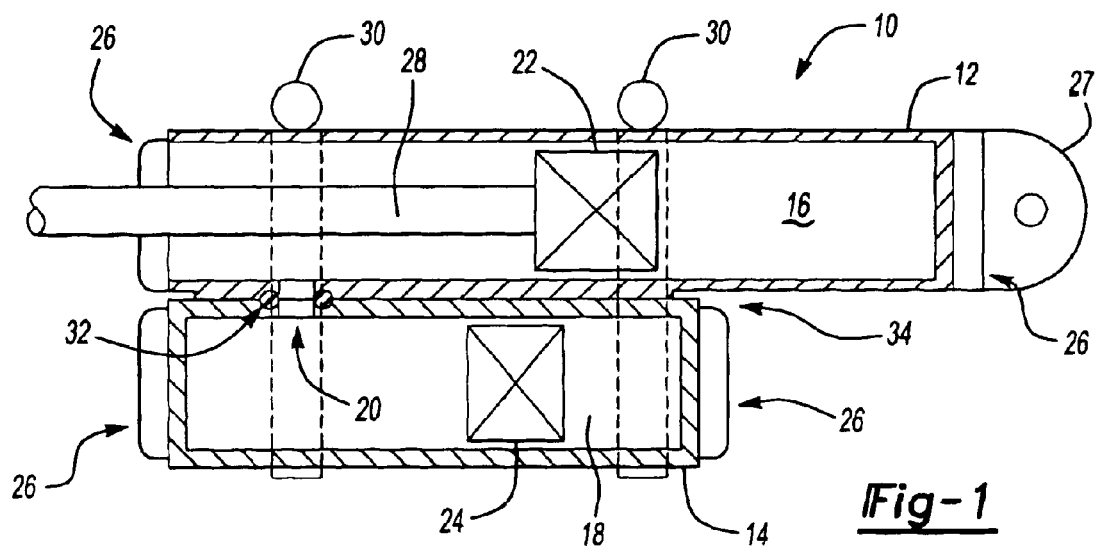
FIG. 1 is a cross-sectional view of an embodiment of this invention.

Referring to FIG. 1, a damper assembly 10 of this invention includes a first housing 12 defining a damper chamber 16. The damper chamber 16 includes a piston 22 attached to a shalt 28. The shaft 28 extends from the damper chamber 16 for mounting of the damper assembly 10. The opposite end of the housing 12 includes an end cap 26 with a mounting opening 27 used for mounting the damper assembly 10. The piston 22 divides the chamber 16 into upper and lower portions. The piston 22 moves within the chamber 16 dampening oscillations between two mounting members (not shown) movable relative to each other. As appreciated, the mounting of the damper assembly 10 is known to a worker skilled in the art and any mounting scheme that is known to a worker skilled in the art would be within the contemplation of this invention.

The damper chamber 16 is in fluid communication with a reservoir chamber 18. The reservoir chamber 18 is defined by a second housing 14. The second housing 14 is mechanically attached to the first housing 12. Straps 30 secure the second housing 14 to the first housing 12. Although straps 30 are shown in FIG. 1, it is within the contemplation of this invention to use other mechanical attachment means known to a worker skilled in the art.

Figure 2:
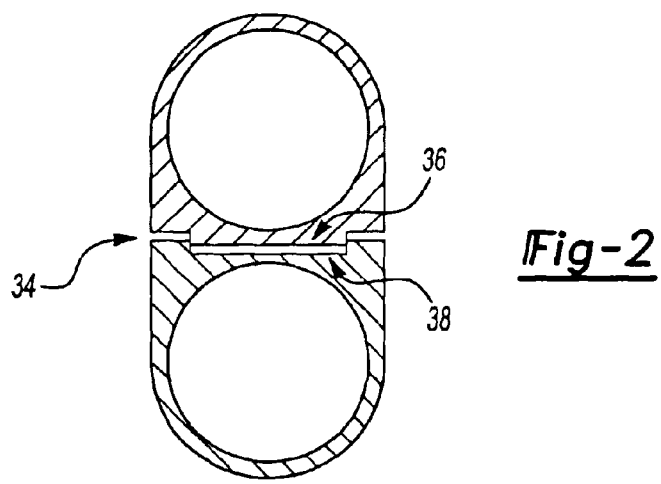
FIG. 2 is a cross-sectional view of an embodiment of this invention illustrating the integrally formed mating features.

Referring now to FIG. 2, mating features 34 align the second housing 14 to the first housing 12 and include a key 36 that is disposed within a keyway slot 38. The key 36 is preferably formed on the first housing 12 and the keyway slot 38 is preferably formed on the second housing 14. Also formed within each of the housings 12, 14 is a passageway 20. The passageway 20 provides fluid communication between the damper chamber 16 and the reservoir chamber 18. The passageway 20 is sealed by an o-ring seal 32 disposed between the housing 12 and 14.

A second piston 24 floats within the reservoir chamber 18. The piston 24 floats relative to the amount of fluid required by the damper chamber 16. As is appreciated, the operation of the damper assembly in conjunction with the reservoir chamber 18 is known to a worker skilled in the art. Other configurations of reservoir damper chamber operations are all within the contemplation of this invention.

Preferably, the housings 12 and 14 are produced by way of an aluminum extrusion. Aluminum extrusion produces long lengths of the desired mating surfaces as shown in FIG. 2 and each of the housings 12 and 14 are cut to the proper and desired length. Each of the housings 12 and 14 are machined to enable the installation of end caps 26. End caps 26 may be of any configuration known to a worker skilled in the art.

Figure 3:
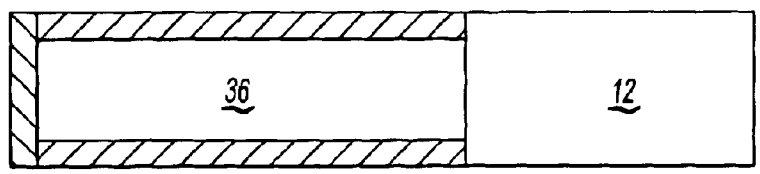
FIG. 3 is a top view of the damper chamber illustrating the key portion integrally formed therein.
Figure 4:
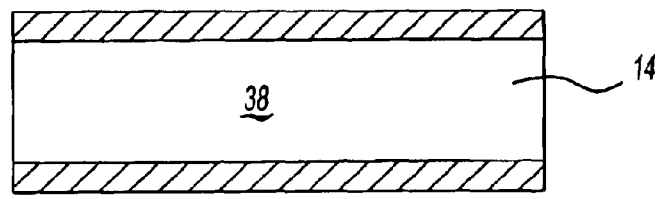
FIG. 4 is a top view of the reservoir chamber showing the integrally formed keyway slot.

Referring to FIGS. 2, 3 and 4, the extruded housings 12 and 14 include the integrally formed mating features 34. The first housing 12 includes the key 36 and the second housing 14 includes the keyway slot 38. Although a key and key slot configuration is shown in this embodiment, it is within the contemplation of this invention that other integrally formed mating features as are known to a worker skilled in the art are within the contemplation of this invention may also be used.

Figure 5:
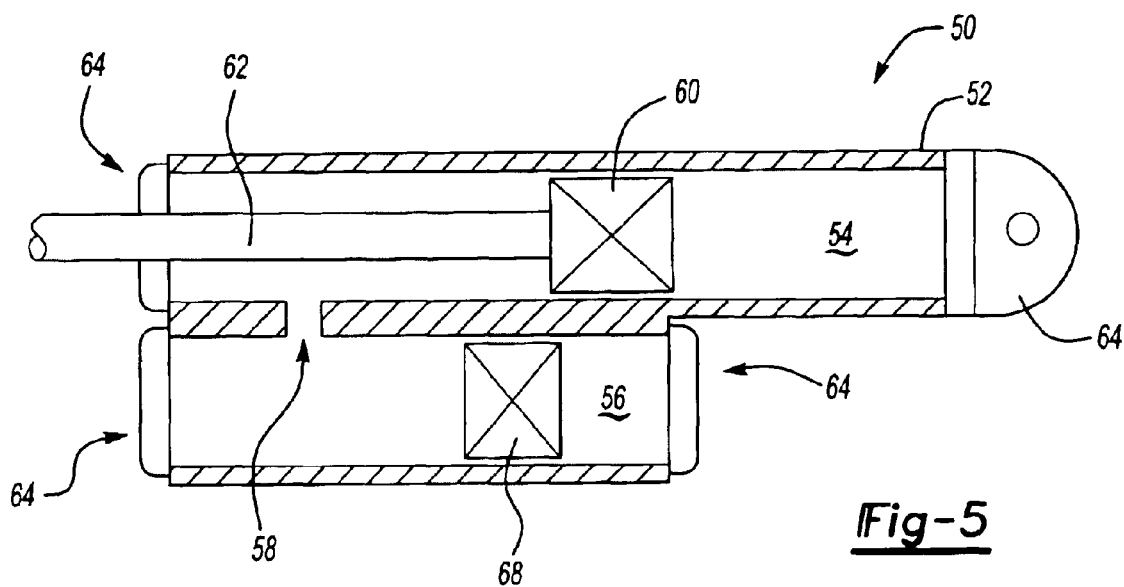
FIG. 5 is another embodiment of this invention.
Figure 6:
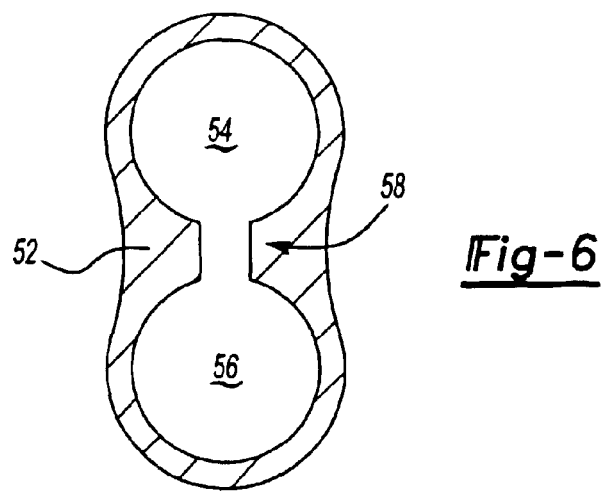
FIG. 6 is a cross-sectional view of the embodiment of FIG. 5.

Referring to FIGS. 5 and 6, another embodiment of a damper assembly is generally indicated at 50 and includes a common housing 52 for damper chamber 54 and reservoir chamber 56. The damper chamber 54 includes a piston 60 attached to a shaft 62. The shaft 62 extends out of the damper chamber 54 for mounting of the damper assembly 50. Disposed between the damper chamber 54 and reservoir chamber 56 is a passageway 58. The passageway 58 is integrally formed within the housing 52. Each end of the housing 52 is closed off by end portions 64. The end portions 64 are threaded into the housing 52 in order to seal off and provide for hydraulic sealing of fluid within the chambers 54, 56. As appreciated, any end portion for sealing the fluid chambers known to a worker skilled in the art are within the contemplation of this invention. Within the reservoir chamber 56 is a floating piston 68 that operates as is known to a worker skilled in the art.

Preferably in this embodiment, an extrusion process is used to form the housing 52 with parallel disposed chambers 54 and 56. The parallel disposed chambers 54 and 56 form both the damper chamber and the reservoir chamber. As is appreciated, the method of extruding the aluminum profile illustrated in FIG. 6 is as known to a worker skilled in the art.

This invention includes the method of forming damper housing 52 by way of an extruded aluminum profile. The profile shown in FIG. 6 would include parallel disposed chambers. Parallel disposed chambers are then machined to adjust for the relative size between the damper chamber 54 and the reservoir chamber 56. Preferably, the reservoir chamber 56 is of a smaller volume relative to the damper chamber 54. However, any size of reservoir chamber relative to damper chamber as is known to a worker skilled in the art would be within the contemplation of this invention. The passage 58 is then formed to communicate hydraulic fluid between the damper chamber 54 and a reservoir chamber 56.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A damper assembly comprising;

a first housing defining a first chamber containing hydraulic fluid and a first piston secured to a rod extending from said first chamber;

a second housing defining a second chamber containing hydraulic fluid and a second piston; and a fluid passage communicating hydraulic fluid between said first and second chambers, said first and second housings including openings cooperating to form said fluid passage, wherein one of said first and second housings includes a key slot and another of said first and second housings includes a key for aligning said openings to form said fluid passage wherein said key and said key slot are disposed longitudinally along each of said first and second housings.

2. The assembly of claim 1, including a seal disposed between said first and second housings at said fluid passage.

3. The assembly of claim 1, including at least one strap for securing said first housing to said second housing.

4. A method of assembling a damper assembly comprising the steps of:

(a.) forming a first chamber within a first housing and second chamber within a second housing;

(b.) sealing each end of said first and second chambers with an end portion;

(c.) forming corresponding openings in each of said first and second chambers to form a portion of a passageway between said first and second chambers, and (d.) forming a key in one of said first and second housings and a keyway corresponding to said key to provide a desired alignment between said corresponding openings in each of said first and second chambers wherein said key and keyway are established longitudinally along each of said first and second housings.

5. The method of claim 4, including securing said first housing to said second housing.

6. The method of claim 4, including installing a seal between said corresponding openings within each of said first and second housings.

7. The method of claim 4, wherein each of said first and second housings define a portion of said passageway.

8. The method of claim 4, including the step of extruding said first and second housings.

* * * * *